United States Patent
Gomes et al.

(10) Patent No.: US 6,493,483 B2
(45) Date of Patent: Dec. 10, 2002

(54) INTEGRATED CIRCUIT PHOTONIC SIGNAL MATRIX

(75) Inventors: David W. Gomes, Jamaica Plains, MA (US); Mani Sundaram, Nashua, NH (US); John S. Ahearn, Amherst, NH (US)

(73) Assignee: BAE Systems Information and Electronic System Integration Inc., Nashua, NH (US)

( * ) Notice: Subject to any disclaimer, the term of this patent is extended or adjusted under 35 U.S.C. 154(b) by 0 days.

(21) Appl. No.: 10/023,368

(22) Filed: Dec. 13, 2001

(65) Prior Publication Data

US 2002/0071629 A1 Jun. 13, 2002

Related U.S. Application Data

(60) Provisional application No. 60/255,338, filed on Dec. 13, 2000.

(51) Int. Cl.[7] .............................. G02B 6/28; G02B 6/35; G02B 6/12
(52) U.S. Cl. ............................... 385/24; 385/14; 385/17
(58) Field of Search ............................... 385/14, 16–24, 385/37; 359/115, 117, 124–134, 164, 165, 173

(56) References Cited

U.S. PATENT DOCUMENTS

| | | | |
|---|---|---|---|
| 4,783,850 A | * 11/1988 | MacDonald et al. | ........ 359/128 |
| 4,798,435 A | 1/1989 | Fujiwara et al. | |
| 5,500,540 A | 3/1996 | Jewell et al. | |
| 5,657,144 A | * 8/1997 | Tanaka et al. | ............... 359/128 |
| 5,671,304 A | 9/1997 | Duguay | |
| 5,798,580 A | 8/1998 | Morozov et al. | |
| 5,914,976 A | 6/1999 | Jayaraman et al. | |
| 6,061,481 A | * 5/2000 | Heidrich et al. | ............... 385/14 |
| 6,097,859 A | 8/2000 | Solgaard et al. | |
| 6,195,485 B1 | 2/2001 | Coldren et al. | |
| 6,256,436 B1 | 6/2001 | Nakama | |
| 6,289,145 B1 | 9/2001 | Solgaard et al. | |
| 6,307,854 B1 | 10/2001 | Webb | |
| 6,344,912 B1 | * 2/2002 | Hajjar et al. | ................. 359/128 |

* cited by examiner

*Primary Examiner*—Akm E. Ullah
*Assistant Examiner*—Michelle R. Connelly-Cushwa
(74) *Attorney, Agent, or Firm*—Scott J. Asmus; Maine & Asmus

(57) ABSTRACT

A signal matrix provides high speed interconnections using optoelectronic elements by detecting wavelength dependent photonic signals at each element of a matrix and re-emitting the detected photonic signals for transmission to an intended destination. Applications include telecommunications and computing, and particularly, cross bar switches and fiber optic bundles.

17 Claims, 4 Drawing Sheets

INTEGRATED CIRCUIT PHOTONIC SIGNAL MATRIX

CROSS REFERENCE TO RELATED APPLICATIONS

The present application is a non-provisional application based upon the provisional application entitled INTEGRATED CIRCUIT PHOTONIC CROSS BAR SWITCH, Ser. No. 60/255,338 filed Dec. 13, 2000, and hereby claims priority from that provisional application.

BACKGROUND OF THE INVENTION

1. Field of the Invention

The present invention generally relates to integrated circuit optoelectronic devices and, more particularly, to matrices of such devices.

2. Statement of the Prior Art

High speed integrated circuit devices are well known and widely used in computing and telecommunications. The constant demand is for ever increasing speed, capacity and component density. Integrated circuit photonic devices are seen as an important part of the future of high speed circuits because they have the advantage of minimizing high frequency electromagnetic interference problems found in electrical circuits. Although photonic devices still convert signals to and from electrical signals, the electrical signal lines can be shortened, and the electromagnetic problems can be significantly reduced. In such circuits, passive optical components must be assembled with the active optoelectronic components in order to make a complete device.

One of the more significant applications which can substantially benefit from the minimized electromagnetic interference of optoelectronic components is that of telecommunications. In particular, switching functions provide complex and difficult signal routing issues which are very susceptible to electromagnetic interference. Attempts to apply matrices of optoelectronic elements have had limited success and have been challenged by the electrical signal routing necessary for such devices.

For the above reasons, it is an objective of the present invention to provide a high speed signal matrix in which integrated optoelectronic devices are used.

It is a further object of the present invention to provide such a signal matrix in the form of a cross bar switch in which any of N inputs can be connected to any of M outputs.

It is a still further object of the present invention to provide such a signal matrix wherein the optical components may be constructed by efficient fabrication methods.

SUMMARY OF THE INVENTION

Accordingly, the one form of the present invention provides an optoelectronic signal matrix for selectively connecting any of N inputs to any of M outputs, including: an integrated circuit matrix having N rows by M columns of optoelectronic matrix elements, with each matrix element including a detector and emitter pair adapted to detect first photonic signals and to re-emit the detected first photonic signals as second photonic signals; one or more input emitters for each N input, adapted to transmit a first photonic signal along a separate respective N matrix row, wherein the first photonic signals transmitted thereby have one or more wavelengths corresponding to one or more respective M outputs; one or more output detectors for each M output, adapted to receive second photonic signals from a separate respective matrix column; a waveguide located adjacent the matrix and adapted to provide a transmission medium along individual rows and along individual columns of the matrix; a separate diffraction grating associated with the waveguide over each detector of each matrix element and adapted to provide wavelength dependent diffraction of the first photonic signals traveling in the waveguide along each N row into the matrix element detector of wavelength respective M columns; and a separate optical distribution element associated with the waveguide over each emitter of each matrix element and adapted to distribute second photonic signals emitted from each matrix element emitter into the waveguide and along the respective M column; wherein the signal matrix is adapted to receive signals at each N input intended for any M output, transmit the received signals through the waveguide as first photonic signals at a wavelength corresponding to the intended M output, diffract the transmitted first photonic signals for detection by the matrix element of the corresponding M column, re-emit the detected signal from the detecting matrix element as a second photonic signal, distribute the second photonic signal into the respective M column and detect the distributed second photonic signal at the respective M output detector.

In another form, the present invention provides a method for connecting electrical signals from any one of N inputs to anyone of M outputs, including; emitting a first photonic signal representing an electrical signal from an N input at a photonic wavelength corresponding to an intended M output, conveying the emitted first photonic signal adjacent a separate row of an integrated circuit matrix of N rows by M columns of optoelectronic matrix elements, detecting the conveyed first photonic signal at a matrix element corresponding to the intended M output, re-emitting the detected first photonic signal as a second photonic signal from the corresponding matrix element, conveying the re-emitted second photonic signal along the respective M column, and detecting the conveyed second photonic signal in the respective M column at the respective M output.

In yet another form, the present invention provides an optoelectronic signal matrix for sending input photonic signals over a fiber optic bundle, including: an integrated circuit matrix having at least N rows of optoelectronic matrix elements, with each matrix element including a detector and emitter pair adapted to detect input photonic signals and to re-emit the detected input photonic signals; a waveguide located adjacent the matrix and adapted to provide a transmission medium along individual rows of the matrix, the waveguide including optical elements for directing input photonic signals into the matrix element detectors from the waveguide; and means for coupling re-emitted photonic signals from the matrix element emitters into a fiber optic bundle; wherein the switch matrix is adapted to detect input photonic signals in the waveguide at each matrix element and re-emit the detected input photonic signals into the optical fiber bundle.

In still another form, the present invention provides an optoelectronic signal matrix for receiving photonic signals from a fiber optic bundle, including: a integrated circuit matrix having at least N rows of optoelectronic matrix elements, with each matrix element including a detector and emitter pair adapted to detect photonic signals and to re-emit the detected photonic signals; means for coupling photonic signals from the fiber optic bundle to the matrix element detectors; and a waveguide located adjacent the matrix and adapted to provide a transmission medium along individual rows of the matrix, the waveguide including optical elements for directing optical signals along the waveguide from the matrix elements emitters; wherein the signal matrix is adapted to detect photonic signals present in the fiber optic bundle and to re-emit these detected photonic signals into the waveguide.

BRIEF DESCRIPTION OF THE DRAWINGS

The present invention is illustratively shown and described in reference to the appended drawings, in which.

DETAILED DESCRIPTION OF THE DRAWINGS

Figure 1:
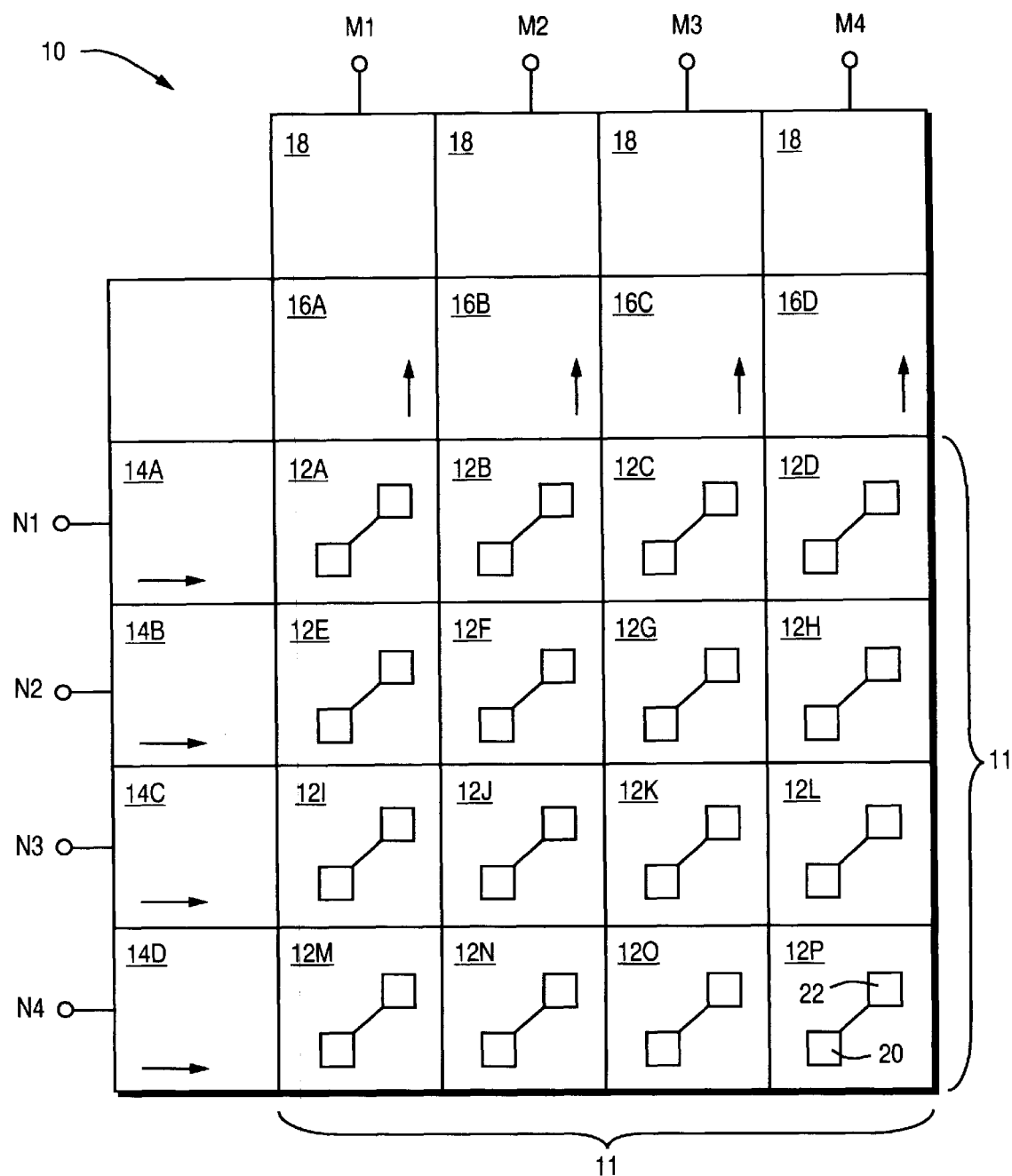
FIG. 1 is representative plan view of a device constructed in accordance with one embodiment of the present invention.

A signal matrix 10 is shown in the plan view of FIG. 1. Signal matrix 10 includes a 4×4 integrated circuit optoelectronic matrix 11 of optoelectronic matrix elements 12A–12P, a separate multi-wavelength emitter 14A–14D for each row of matrix 11 and a separate multi-wavelength detector 16A–16D for each column of matrix 11. Each of the emitters 14 is shown with a representative signal input port N1–N4. Each of the multi-wavelength detectors 16 is shown with a respective de-conflicting circuit 18 and a respective signal output port M1–M4. In practice, the optoelectronic devices 12, 14 and 16 would be constructed from optoelectronic material and electrically bump-bonded to an ASIC (application specific integrated circuit) 60 of FIG. 3, while the input and output ports N,M and the de-conflicting circuits 18 could be constructed as part of the same ASIC. Each matrix element 12 is constructed with a detector 20 and an emitter 22, and detected photonic signals are coupled to the emitters 22 of each respective matrix element as shown. Each multi-wavelength detector 16 could include a plurality of detectors for simultaneously detecting a plurality of different wavelengths.

The conventions N and M are used notionally to designate rows and columns of the optoelectronic matrix 11, and are not intended to limit the manner in which the signal matrix of the present invention may be implemented.

Signals received at each input N1–N4 cause first photonic signals to be emitted by the respective emitter 14 at a wavelength corresponding to the intended output port M1–M4 of the respective input signal. The emitted first photonic signals are transmitted laterally across the matrix and detected by a matrix element detector 20, which may be specifically tuned for that wavelength. In this manner, signals intended for a specific M output port are only received by a matrix element detector 20 corresponding to that port. This detection causes a responsive re-emission of a second photonic signal by the detecting matrix element 12 in the orthogonal matrix direction relative to the first photonic signal. The re-emitted second photonic signals can have a wavelength corresponding to each of the separate N input ports. In this manner, signals simultaneously received by the same M output port from different N input ports can be differentiated by the multi-wavelength detector 16. Such conflicting signals are handled by de-conflicting circuits 18 and passed on to the corresponding M output port. De-conflicting circuits 18 may perform any suitable multiplexing function, such as time domain multiplexing, to allow the reception of simultaneous signals from more than one M input. De-conflicting circuits 18 may also simply create multiple outputs for each port M1–M4.

As mentioned, de-conflicting circuits may be created in an underlying ASIC or even in a second ASIC bonded to the underlying ASIC. The specific circuits used will depend upon the desired de-conflicting function and can be created in accordance with known circuits and known construction methods.

Figure 2:
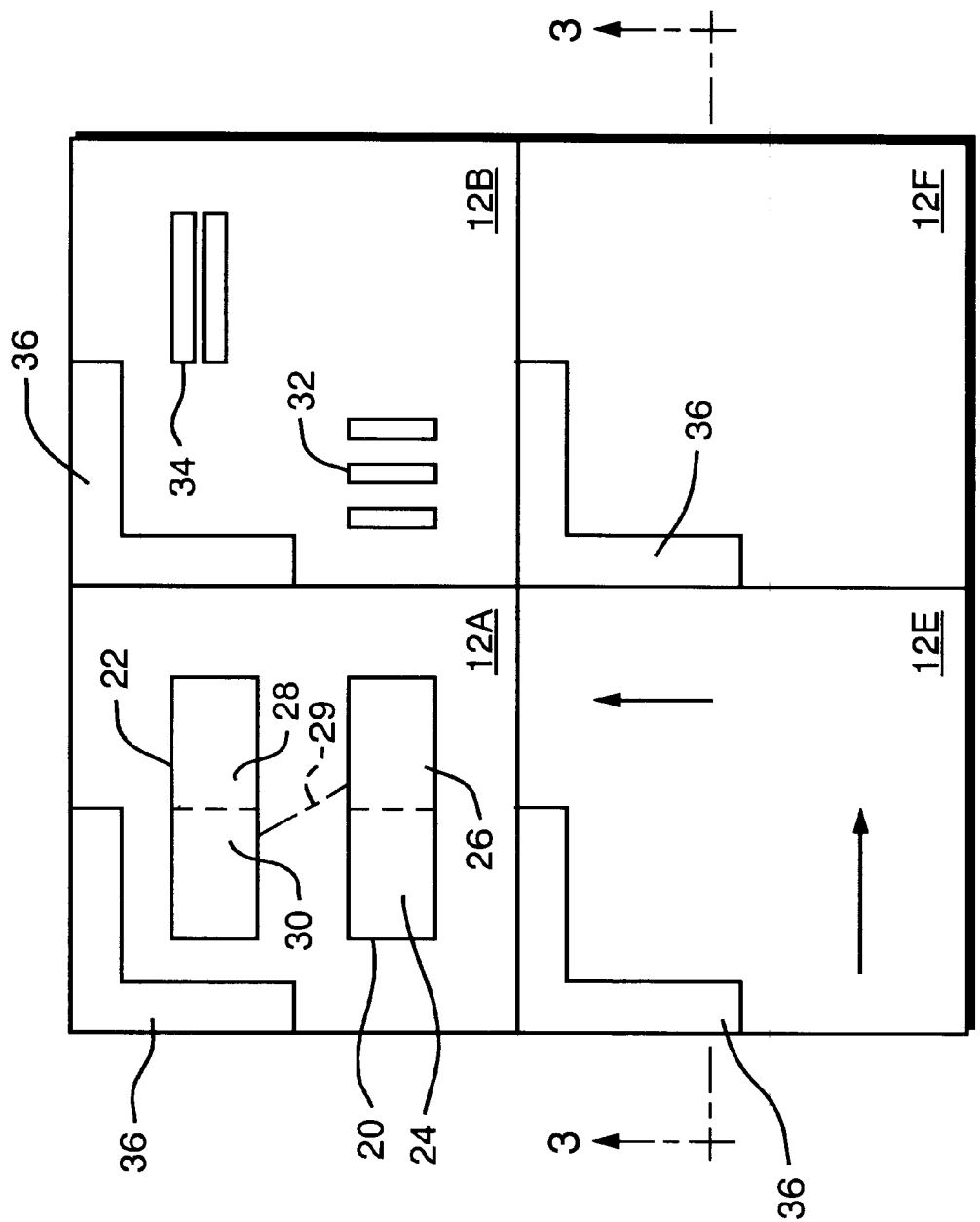
FIG. 2 is a more detailed, partial plan view of a portion of the device of FIG. 1.

FIG. 2 shows a magnified plan view of several of the matrix elements 12A, 12B, 12E and 12F of FIG. 1. For purposes of illustration different detail is shown in each matrix element 12A and 12B, however all array elements 12A–12P are intended to be identical. Each element, such as 12A, includes a detector 20 and an emitter 22. Each detector 20 and emitter 22 has its surface area shared between a photonic surface and an electrical contact. Each detector 20 has a photonic reception surface 24 and an electrical contract 26. Likewise, each emitter 22 has a photonic emission surface 28 and an electrical contact 30. Because the detectors and emitters use photonic signals traveling in a normal direction in relation to their respective photonic surface, represented by the drawing surface, and the photonic signals propagate across matrix 11 parallel to this surface, the photonic signals must be redirected for detection and also after re-emission. This is accomplished with the use of diffraction gratings 32 located over the photonic reception surfaces 24 of detectors 20 and by optical distribution elements located over photonic emission surfaces 28, as shown in element 12B. Diffraction gratings 32 are constructed in accordance with the intended wavelengths of their respective detectors 20. Input data signals travel from left to right in FIG. 2 and are redirected into detectors 20 by the diffraction gratings 32. Corresponding signals from emitters 22 are emitted normally in relation to the matrix surface and redirected, generally parallel to that surface, to the bottom and top of FIG. 2. The orthogonal arrangement of the detector and emitter gratings helps to isolate the N input photonic signals from the M output photonic signals.

Any suitable optical elements may be used for diffraction gratings 32 and distribution elements 34. One example known in the prior art of a suitable diffraction grating 32 is formed by etching a series of rectangular pits into the top surface of a waveguide with a pattern similar to that shown in FIG. 2. The pits and top surface of the waveguide are then coated with a reflective material, such as gold. The wavelength dependent response of the diffraction grating 32 is determined by the size and spacing of the pits. The short width of each pit is typically one half of the periodic spacing of the pits in the same direction. In this manner, diffraction grating 32 will diffract photonic signals having an effective wavelength equal to the periodic spacing, when such signals are traveling through the waveguide in the opposing directions of the first photonic signal flow shown in FIG. 1. The resulting diffraction will redirect the photonic signals downward in the waveguide away from grating 32. Thus the spacing and size of pits are used to tune the response of grating 32 to a specific wavelength. Another example of a suitable, known, diffraction grating 32 would be a metal grating deposited on the top surface of the waveguide.

One example known in the prior art of a suitable distribution element 34 is a scattering element. A scattering element may simply be formed as a multiplicity of triangularly shaped trenches again formed in the top surface of a waveguide. Such triangularly shaped trenches, as well as the top waveguide surface are coated with a highly reflective material such as gold. The triangular sides need to have a reflective feature length equal to or larger than the wavelength of interest in the waveguide medium. Photonic signals entering the waveguide in a normal direction are redirected along the wave guide as desired. Any other suitably performing optical distribution element such as the above described diffraction gratings may also be used for distribution element 34.

FIG. 2 also depicts an option for the matrix in the form of photon or light absorbing blind or baffle 36, which help to channel the first and second photonic signals. The blind can be formed during construction of the matrix by etching patterns into the optical medium in a manner dependent upon the specific construction process used. The etched patterns can then be filled with light absorbing material such as epoxy. In this manner, photonic signals may still be transmitted from left and right and to the bottom and top of FIG. 2 while stray diagonal light would be blocked by the blind 36. This arrangement could be combined with the plan of detectors 20 and emitters 22 and the placement of their respective photonic and electrical contact areas, so that re-emitted photonic signals do not necessarily pass over diffraction gratings for any of the detectors 20. In other words, output photonic signals are transmitted, to the bottom and top of FIGS. 1 and 2, through each conversion element 12 on one side (right as shown) of that element, whereas the detector grating 32 for each matrix element 12 is located on the other side (left as shown) thereof. Also, input or first photonic signals are transmitted from left to right along the lower portion of each matrix element 12, as shown, and are not intentionally transmitted over the diffraction gratings of any of the emitters to prevent interference of signals or creation of false emission signals.

Although the matrix 11 is shown with N inputs on one side and M outputs on an orthogonal side, the present invention covers embodiments where the first photonic signals may be emitted from two opposing matrix sides and the second photonic signals may be detected along two opposing matrix sides. This exemplifies a significant advantage of the present invention in that the signal matrix 10 may be expanded in multiple directions around the basic matrix 11. Thus, the optical waveguides for the M columns may be extended and the optical signals therein picked up by separate additional detectors. The signals thus detected may be processed in the ASIC on which the optical elements are and the signals can then be fed to further optoelectronic matrices on the same ASIC substrate. In this manner, serial signal addressing may be performed to expand upon the basic addressing capacity of the first matrix 11. Alternatively, the output optical signals so detected may be individually optically routed elsewhere on the ASIC substrate by a series of detector/emitter elements as found in matrix 11. This application could provide and aid spatial signal deconfliction. Thus, the use of multi-wavelength output detectors 16 as output ports is not required.

Figure 3:
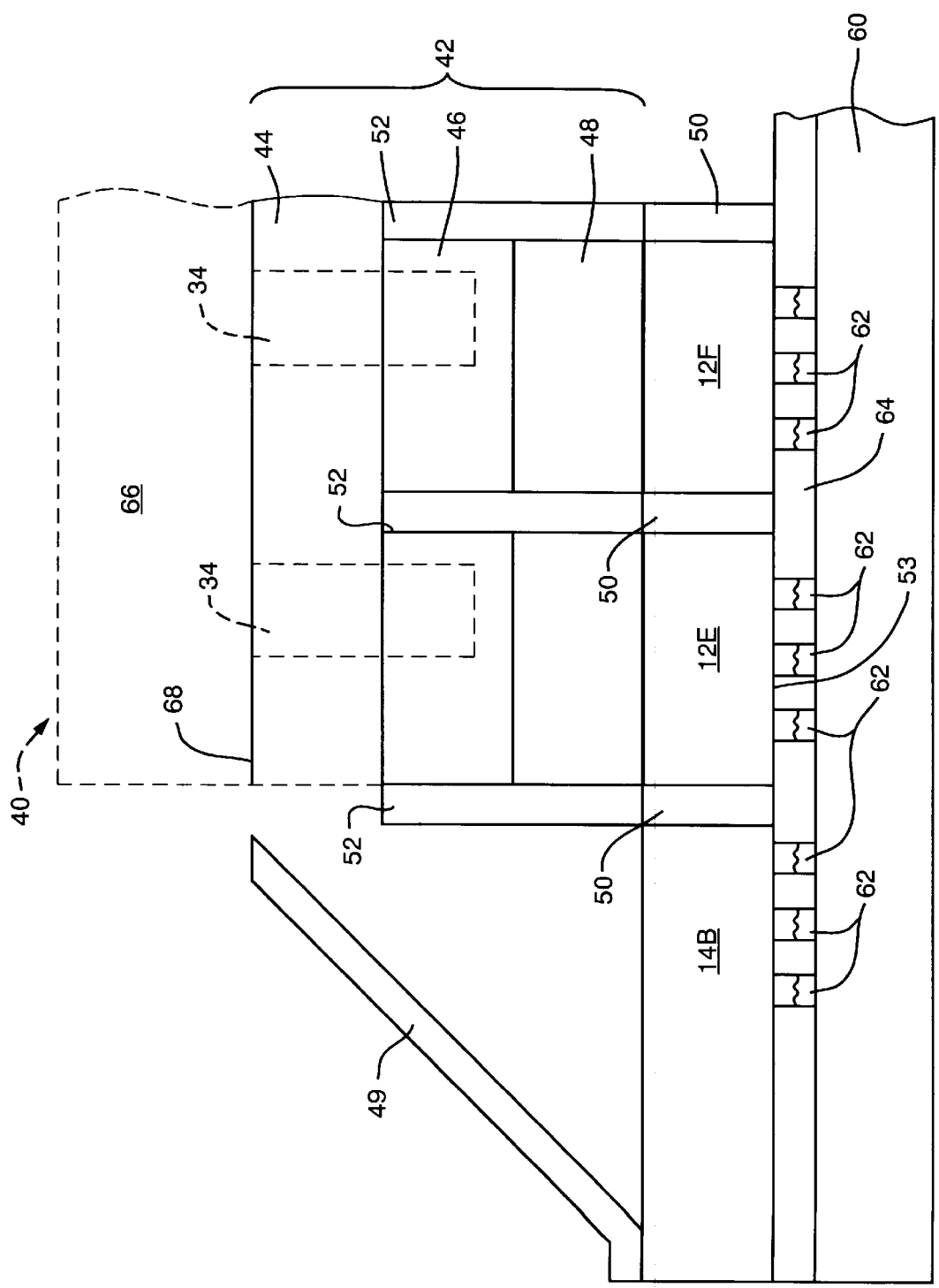
FIG. 3 is a representative sectional view of the device of FIGS. 1 and 2 taken along view lines 3—3 FIG. 2.

A representative cross-section is shown in FIG. 3 taken along lines 3—3 in FIG. 2. FIG. 3 differs from FIG. 2 in that it additionally shows the cross-section of an input emitter 14B. FIG. 3 generally shows a portion of the signal matrix 11 represented by individual optoelectronic matrix elements 12E and 12F. A waveguide 42 is located adjacent the matrix elements 12E and 12F. Waveguide 42 may be made up of several layers 44, 46 and 48 of transmissive photonic material to assist in channeling photonic energy. Optical distribution elements 34 are shown formed in the waveguide 42. FIG. 3 also shows a multi-wavelength emitter 14B located adjacent matrix element 12E. Matrix elements 12E and 12F and emitter 14B are electrically connected to an ASIC 60 by means of metalbonds 62. ASIC 60 provides the various drive, biasing and signal lines for the optoelectronic elements 12, 14 and 16 in a manner well known in the prior art. Affixed to emitter 14B is a mirror 49. Photonic signals from emitter 14B are reflected into the waveguide 42 to reach the various detectors 20. Alternatively, any other suitable device may be used for redirecting signals from emitters 14 into the matrix 11. FIG. 3 also shows separators 50 and extensions 52 thereof. Separators 50 electrically isolate the optoelectronic elements 12E, 12F and 14B and the extensions 52 function as the partial blinds 36 of FIG. 2.

Figure 4:
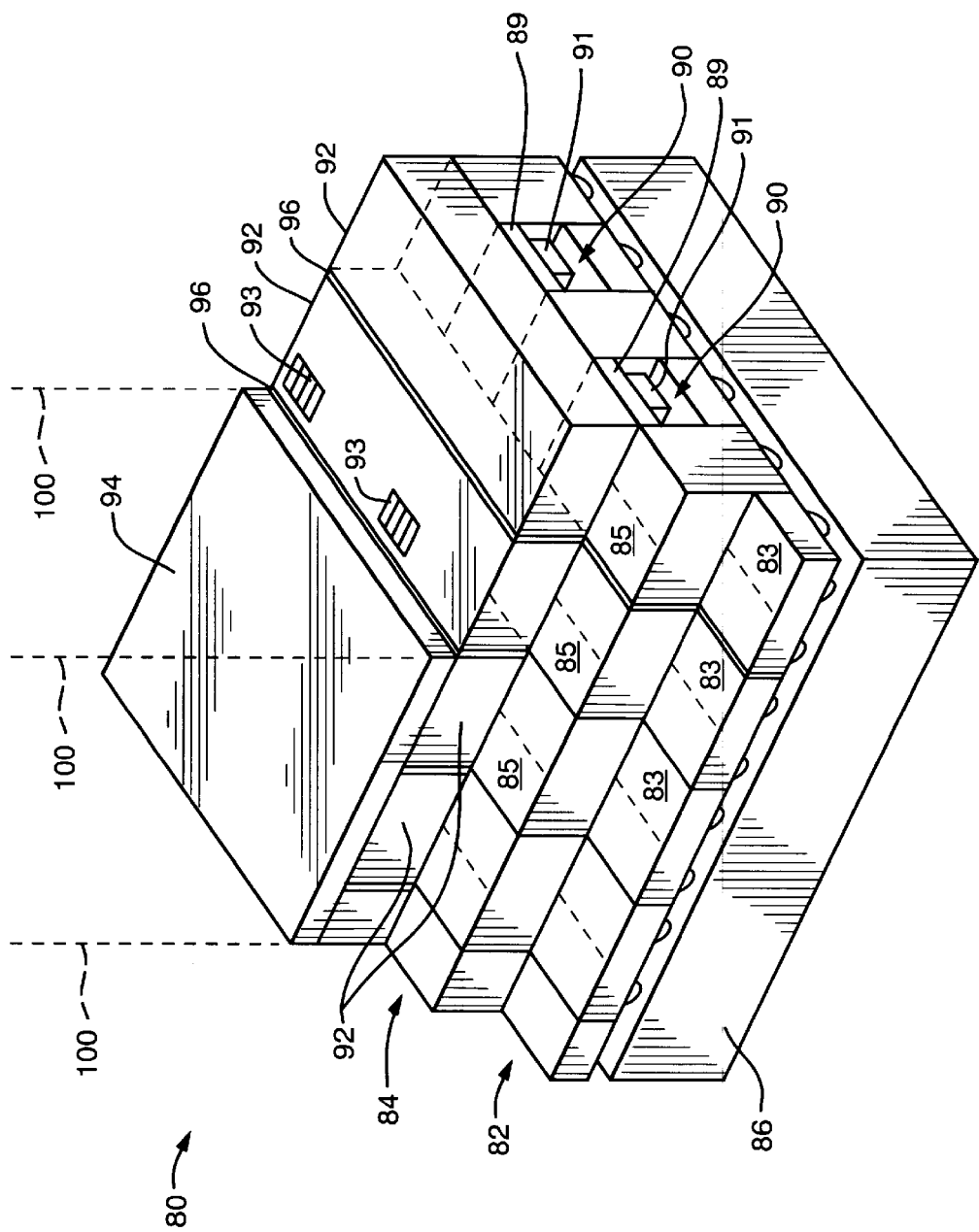
FIG. 4 is a partially exposed representative perspective view of a device constructed in accordance with another embodiment of the present invention.

FIG. 4 shows a partially exposed, perspective view of a optoelectronic matrix 80. Matrix 80, in useable form, would be a full, three dimensional structure. It is shown in FIG. 4 with various sections exposed to illustrate internal features. These internal features, which are shown for only some of the elements, are actually consistent for all of the elements and throughout the structure.

Matrix 80 includes alternating rows of detectors 82 and emitters 84. Each of the emitters 82 and detectors 84 include an active photonic surface 83, 85, respectively, and an electrical contact as previously described in reference to FIG. 2. The rows of detectors 82 and emitters 84 are flip-chip bump-bonded to a control ASIC 86, which contains the driving and biasing circuits necessary for use of detectors 82 and emitters 84. Detectors 82 have a shorter height relative to emitters 84 and are coupled to separate waveguides.

Each row of detectors 82 has a separate waveguide 90 and the rows of emitters 84 are coupled to separate waveguides 92. Each detector waveguide 90 includes a diffraction grating 91 located over each respective photonic surface 83. Likewise, each emitter waveguide 92 includes a separate optical distribution element 93 located over each emitter photonic surface 85. Each waveguide 90 is covered by a reflective coating 89, and all of the emitter waveguides 92 are covered by reflective coating 94. Also, the emitter waveguides 92 is separated from each other by partitions 96. FIG. 4 also shows an alternate embodiment in which the reflective layer 94 is replaced by a waveguide or a fiber optic bundle represented by phantom lines 100.

Matrix 80 functions in the same general manner as matrix 11 of FIGS. 1–3. Input or first photonic signals are emitted into waveguides 90 and travel there until they encounter a diffraction grating 91 having features responsive to the wavelength of the photonic signal in the optical medium of waveguide 90. Thus signals are diffracted into the active surface 83 of detectors 82, where they are converted into corresponding electrical signals. These electrical signals are coupled through ASIC 60 into the complimentary emitter 84 of each matrix element and re-emitted through a photonic surface 85. The re-emitted, or second photonic signals enter waveguide 92 and are scattered by optical distribution element 93. In addition to the optical distribution elements 93, which are designed to control the direction of scattering, waveguides 92 are further aided by partitions 96, which may be formed from either reflective, refractive or absorptive materials to prevent interfering signals from entering adjacent waveguides 92.

In the alternate embodiment of FIG. 4, the reflective coating 94, and even the entire structure of waveguides 92, may be replaced by the end of a waveguide structure or the end of an ordered array of optical fibers represented by phantom lines 100, and distribution elements 93 would not be present. In this configuration, photonic signals from emitters 84 would be transmitted into this waveguide or ordered fiber array and could thereby form an element of a communications systems. If waveguides 92 do remain, similar partitions could be formed orthogonally to partitions 96 to minimize cross talk between adjacent emitters 84 in the same waveguide 92.

An even further embodiment is represented in FIG. 4 wherein the matrix 80 is used to receive signals from a waveguide or ordered fiber array. In this configuration, the detectors 82 and emitters 84 would have to be constructed to function as the opposite element, so that photonic signals would be received from a waveguide or ordered fiber array and be converted and re-emitted as photonic signals into waveguides 90. For this arrangement, either the diffraction gratings 91 could be used, or they could be replaced by suitable distribution elements.

The signal matrix of the present application may be constructed by one of several well known methods. For example the emitters and detectors may be constructed separately and then separately flip-chip bonded to an ASIC or the emitters and detectors may be constructed as a single optoelectronic matrix and then flip-chip bonded in a single process step. Likewise the waveguide may be constructed by several well known methods. For example the waveguide may be constructed and attached in either order, or the waveguide could be constructed integrally with the active emitters and detectors and the waveguide features processed into the structure either before or after bonding to the ASIC. These construction methods are described in reference to FIGS. 3 and 4.

FIG. 3 generally illustrates the construction of the matrix elements 12 as an integral process with the optical medium of waveguide 42. Such a process could start with a suitable substrate such as GaAs, as is the case for GaAs based optoelectronic devices. The wavelengths of photonic signals can be chosen so where GaAs is transparent to them and therefore the GaAs substrate may be used to form the waveguide 42. An intermediate layer 46 of aluminum gallium arsenide AlGaAs, having a different refractive index than GaAs may be used to help channel photonic signals within waveguide 42. For this purpose, a layer of AlGaAs would be grown on the GaAs substrate 40 and this would be followed by a layer of GaAs. This would be followed by the various layers used to construct the active elements 12, 14 and 16.

Active elements 12, 14 and 16 are then constructed by known techniques and individually designed in accordance with the desired performance of those devices. The active devices may be typically created as photo diodes, vertical cavity surface emitting lasers (VCSELs), or light emitting diodes. Detectors 20 may be enhanced with resonant cavity structures tuned to specific wavelengths so that the construction of both the diffraction gratings and the detectors is used to discriminate in favor of the intended wavelengths. Such construction techniques can also be used for multi-wavelength output detectors 16 by having separate detectors similarly tuned for the different wavelengths.

The combination of wavelength specific detectors and wavelength responsive diffraction gratings provides a significant amount of wavelength differentiation. In this manner, the present embodiments may have an application in wavelength division de multiplexing, wherein simultaneously received photonic signals having separate wavelength signals may be effectively de-multiplexed.

Once these optoelectronic devices 12, 14 and 16 are formed, they can be separated by etching a series of channels 50 into the layers. Channels 50 may be partially extended by masking non-extended portions and further etching, to form the shape of partial blinds 36. After etching, a flowable, photon absorbing material such as epoxy may be applied to the channels 50 and extensions 52 to form the actual separators 50 and blinds 36. Next, solder balls 62 would be affixed to the exposed surface 53 and the substrate would be flip-chip chip bonded to an ASIC. Another flowable hardener, such as epoxy may be forced into the space 64 to add mechanical strength to the structure. This added strength aids in the step of substrate removal, in which the excess portion 66 of substrate 40 is removed by grinding and etching to thus complete the waveguide 42 with a layer 44 of GaAs. With the excess portion 66 removed, the exposed surface 68 may be processed to create the optical distribution elements 34 and diffraction gratings 32. This would be followed by coating the surface 68 with a highly reflective material such as gold.

An alternative process, relative to FIG. 3 would entail the growth and separation of active elements 12, 14 and 16 by known methods followed by the attachment of an optical medium to form waveguide 42. The optical features of waveguide 42 could be constructed either before or after such attachment. The material used to so form waveguide 42 may be any material which is suitable for both feature processing and for the optical characteristics required. Examples of such material are quartz, sapphire, and GaAs.

A different construction process may be generally described in reference to signal matrix 80 of FIG. 4. The detectors 82 and emitters 84 may also be separately formed and separately bonded to ASIC 86. This could be done as a two dimensional array of detector rows formed on a substrate. After bonding, the substrate is then removed leaving the rows of detectors 82. This is generally followed by the similar bonding of a two dimensional array of emitter rows, inter-digitated between the detector rows. This is likewise followed by the removal of the emitter substrate thus exposing the parallel rows of detectors 82 and emitters 84. Next, a suitable transparent material, such as a flowable polymer would be used to form waveguides 90. After hardening, the transparent material would be processed to form diffraction gratings 91, and waveguides 90 would be covered by a highly reflective layer 89, such as gold. In this manner waveguides 90 are isolated from subsequently formed waveguides 92. Waveguides 92 may be applied in any suitable manner, such as a solid element, which is processed to form distribution elements 93 and partitions 96 either before or after such application. Likewise, waveguides 92 may be formed from a flowable polymer.

All of the individual process steps described above are generally known to persons skilled in the art.

In conclusion, the present invention provides an effective signal matrix for controllably interconnecting high frequency signals using a matrix of optoelectronic components. The matrix provides complete interconnectivity while minimizing the input/output constraints associated with such matrices. While other efforts to employ such matrices attempt to electrically connect high speed data signals to each matrix element, the present invention avoids such electrical signal routing while taking advantage of matrix performance. Further, the optoelectronic components may be easily constructed and/or assembled with their required optical components for efficient manufacturing.

The embodiments of the present invention described above are intended to be taken in an illustrative and not a limiting sense. Various modifications and changes may be made to the above embodiments by persons skilled in the art without departing from the scope of the present invention defined in the appended claims.

What is claimed is:

1. An optoelectronic signal matrix for selectively connecting any of N inputs to any of M outputs, comprising:
   an integrated circuit matrix having N rows by M columns of optoelectronic matrix elements, with each matrix element including a detector and emitter pair adapted to detect first photonic signals and to re-emit the detected first photonic signals as second photonic signals;
   one or more input emitters for each N input, adapted to transmit a first photonic signal along a separate respective N matrix row, wherein the first photonic signals transmitted thereby have one or more wavelengths corresponding to one or more respective M outputs;
   one or more output detectors for each M output, adapted to receive second photonic signals from a separate respective matrix column;
   a waveguide located adjacent the matrix and adapted to provide a transmission medium along individual rows and along individual columns of the matrix;
   a separate diffraction grating associated with the waveguide over each detector of each matrix element and adapted to provide wavelength dependent diffraction of the first photonic signals traveling in the waveguide along each N row into the matrix element detector of wavelength respective M columns; and
   a separate optical distribution element associated with the waveguide over each emitter of each matrix element and adapted to distribute second photonic signals emitted from each matrix element emitter into the waveguide and along the respective M column;
   wherein the signal matrix is adapted to receive signals at each N input intended for any M output, transmit the received signals through the waveguide as first photonic signals at a wavelength corresponding to the intended M output, diffract the transmitted first photonic signals for detection by the matrix element of the corresponding M column, re-emit the detected signal from the detecting matrix element as a second photonic signal, distribute the second photonic signal into the respective M column and detect the distributed second photonic signal at the respective M output detector.

2. The signal matrix of claim 1, wherein each of the matrix element emitters in an M column uses a separate photonic wavelength corresponding to a separate N input.

3. The signal matrix of claim 1, wherein the first photonic signals include multiple separate signals each having a separate wavelength corresponding to a separate M output.

4. The signal matrix of claim 1, wherein the integrated circuit matrix includes ASIC circuits adapted for driving each of the emitters and detectors of the integrated circuit matrix elements and for coupling detected signals between the detector and emitter of each matrix element.

5. The signal matrix of claim 1, wherein the integrated circuit matrix is substantially planar.

6. The signal matrix of claim 5, wherein the waveguide includes partial blinds formed from photon absorbing material, and further wherein such blinds are adapted to aid channeling of the first and second photonic signals and to reduce stray photonic signals between different rows and columns of the planar integrated circuit matrix.

7. The signal matrix of claim 6, wherein the rows and columns of the matrix are substantially orthogonal.

8. The signal matrix of claim 5, wherein the diffraction gratings and scattering elements are formed in the waveguide, and further wherein the waveguide is affixed to the planar integrated circuit matrix.

9. A method for connecting electrical signals from any one of N inputs to anyone of M outputs, comprising:
   emitting a first photonic signal representing an electrical signal from an N input at a photonic wavelength corresponding to an intended M output;
   conveying the emitted first photonic signal adjacent a separate row of an integrated circuit matrix of N rows by M columns of optoelectronic matrix elements;
   detecting the conveyed first photonic signal at a matrix element corresponding to the intended M output;
   re-emitting the detected first photonic signal as a second photonic signal from the corresponding matrix element;
   conveying the re-emitted second photonic signal along the respective M column; and
   detecting the conveyed second photonic signal in the respective M column at the respective M output, wherein both steps of conveying include passing the first and second photonic signals through a waveguide located adjacent the matrix.

10. The method of claim 9, wherein the step of conveying the emitted first photonic signal includes diffracting the first photonic signal according to photonic wavelength from the waveguide into the matrix element corresponding to the intended M output.

11. The method of claim 10, wherein the step of conveying the re-emitted second photonic signal includes scattering the re-emitted second photonic signal into the waveguide along the respective M column.

12. The method of claim 11, wherein the step of re-emitting the first photonic signal as a second photonic signals includes using a separate wavelength corresponding to each N input.

13. The method of claim 12, wherein the step of re-emitting the detected first photonic signal includes coupling the detected signal between a detector and an emitter of the respective matrix element.

14. An optoelectronic signal matrix for sending input photonic signals over a fiber optic bundle, comprising:
   an integrated circuit matrix having at least N rows of optoelectronic matrix elements, with each matrix element including a detector and emitter pair adapted to detect input photonic signals and to re-emit the detected input photonic signals;
   a waveguide located adjacent the matrix and adapted to provide a transmission medium along individual rows of the matrix, the waveguide including optical elements for directing input photonic signals into the matrix element detectors from the waveguide; and
   means for coupling re-emitted photonic signals from the matrix element emitters into a fiber optic bundle;
   wherein the signal matrix is adapted to detect input photonic signals in the waveguide at each matrix element and re-emit the detected input photonic signals into the optical fiber bundle.

15. The signal matrix of claim 14, wherein the optical elements include wavelength specific diffraction gratings located along one or more matrix rows and adapted to direct photonic signals present within the waveguide into matrix element detectors along the matrix rows.

16. An optoelectronic signal matrix for receiving photonic signals from a fiber optic bundle, comprising:
   a integrated circuit matrix having at least N rows of optoelectronic matrix elements, with each matrix element including a detector and emitter pair adapted to detect photonic signals and to re-emit the detected photonic signals;

means for coupling photonic signals from the fiber optic bundle to the matrix element detectors; and a waveguide located adjacent the matrix and adapted to provide a transmission medium along individual rows of the matrix, the waveguide including optical elements for directing optical signals along the waveguide from the matrix elements emitters;

wherein the signal matrix is adapted to detect photonic signals present in the fiber optic bundle and to re-emit these detected photonic signals into the waveguide.

17. The signal matrix of claim 16, wherein the optical elements include scattering elements located along one or more matrix rows and adapted to direct photonic signals along the waveguide from the emitters of the matrix elements along the matrix rows.

* * * * *